United States Patent
Zhang et al.

(10) Patent No.: US 12,512,991 B2
(45) Date of Patent: Dec. 30, 2025

(54) IMPLEMENTATION OF ONE-TOUCH LOGIN SERVICE

(71) Applicant: Alipay (Hangzhou) Information Technology Co., Ltd., Zhejiang (CN)

(72) Inventors: Wanqiao Zhang, Hangzhou (CN); Lin Huang, Hangzhou (CN); Juhu Nie, Hangzhou (CN); Yunding Jian, Hangzhou (CN); Wei Fu, Hangzhou (CN); Hongjian Cao, Hangzhou (CN); Yujia Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 91 days.

(21) Appl. No.: 18/398,424

(22) Filed: Dec. 28, 2023

(65) Prior Publication Data
US 2024/0137221 A1    Apr. 25, 2024

Related U.S. Application Data

(63) Continuation of application No. PCT/CN2022/135823, filed on Dec. 1, 2022.

(30) Foreign Application Priority Data

Dec. 22, 2021   (CN) .......................... 202111579026.2

(51) Int. Cl.
*H04L 9/32*     (2006.01)
*H04L 9/40*     (2022.01)
(Continued)

(52) U.S. Cl.
CPC .......... *H04L 9/3213* (2013.01); *H04L 9/3297* (2013.01); *H04L 63/0876* (2013.01); *H04W 12/06* (2013.01); *H04W 12/084* (2021.01)

(58) Field of Classification Search
CPC . H04L 63/0876; H04L 9/3213; H04L 9/3297; H04W 12/06; H04W 12/084
See application file for complete search history.

(56) References Cited

U.S. PATENT DOCUMENTS 8,732,452 B2 * 5/2014 Byrum ................ H04L 63/0435
                                                          713/153
10,243,741 B2 * 3/2019 Cohen .................... H04L 63/061
(Continued)

FOREIGN PATENT DOCUMENTS

CN    101448001    6/2009
CN    102006271    4/2011
(Continued)

OTHER PUBLICATIONS

International Search Report and Written Opinion in International Appln. No. PCT/CN2022/135823, mailed on Feb. 24, 2023, 10 pages(with English translation).
(Continued)

*Primary Examiner* — Mohammad A Siddiqi
(74) *Attorney, Agent, or Firm* — Fish & Richardson P.C.

(57) ABSTRACT

Computer-implemented methods, non-transitory, computer-readable media, and computer-implemented systems implementing a one-touch login service are described. Information about a first IP address is obtained from a verification request sent by an application client device. A token is sent to the application client device. Information about a second IP address is obtained from a number acquisition request sent by an application server. Whether the first IP address is the same as the second IP address is determined. If the same, based on a token carried in the number acquisition request, a mobile phone number of a terminal device in which the application client device is located is obtained and the mobile phone number is sent to the application server. If not
(Continued)

the same, sending the mobile phone number of the terminal device to the application server is refused.

20 Claims, 6 Drawing Sheets

(51) Int. Cl.
*H04W 12/06* (2021.01)
*H04W 12/084* (2021.01)

(56) References Cited

U.S. PATENT DOCUMENTS

| | | | |
|---|---|---|---|
| 10,757,089 B1 * | 8/2020 | Hohler | H04L 63/0807 |
| 10,783,506 B2 * | 9/2020 | Dutta | G07C 9/00309 |
| 11,032,270 B1 | 6/2021 | Tsarfati et al. | |
| 11,637,817 B2 * | 4/2023 | Kravitz | H04L 63/126 |
| | | | 726/26 |
| 12,236,420 B2 * | 2/2025 | Wotherspoon | G06Q 20/34 |
| 2009/0222900 A1 * | 9/2009 | Benaloh | H04L 63/0807 |
| | | | 726/10 |
| 2011/0055585 A1 * | 3/2011 | Lee | H04L 9/3226 |
| | | | 713/183 |
| 2011/0138483 A1 | 6/2011 | Bravo et al. | |
| 2014/0372293 A1 * | 12/2014 | Leung | H04W 4/24 |
| | | | 705/40 |
| 2017/0272415 A1 * | 9/2017 | Zhao | H04L 63/0807 |
| 2018/0332016 A1 * | 11/2018 | Pandey | H04L 63/0428 |
| 2020/0236105 A1 * | 7/2020 | Doshi | H04W 12/084 |
| 2021/0081947 A1 | 3/2021 | Hockey et al. | |
| 2021/0105286 A1 | 4/2021 | Kuperman et al. | |
| 2021/0174415 A1 * | 6/2021 | Narasimhan | G06Q 30/0248 |
| 2024/0364522 A1 * | 10/2024 | Leyva | H04L 9/3213 |

FOREIGN PATENT DOCUMENTS

| | | |
|---|---|---|
| CN | 103297404 | 9/2013 |
| CN | 103313245 | 9/2013 |
| CN | 104902028 | 9/2015 |
| CN | 105101205 | 11/2015 |
| CN | 105897771 | 8/2016 |
| CN | 106130971 | 11/2016 |
| CN | 106470201 | 3/2017 |
| CN | 107948204 | 4/2018 |
| CN | 109089264 | 12/2018 |
| CN | 109688147 | 4/2019 |
| CN | 110351298 | 10/2019 |
| CN | 110392065 | 10/2019 |
| CN | 110691087 | 1/2020 |
| CN | 110798453 | 2/2020 |
| CN | 111770057 | 10/2020 |
| CN | 113423107 | 9/2021 |
| CN | 113765906 | 12/2021 |
| CN | 114390524 | 4/2022 |
| CN | 117098134 | 11/2023 |
| WO | WO 2010/031299 | 3/2010 |
| WO | WO 2023/116382 | 6/2023 |

OTHER PUBLICATIONS

Extended European Search Report in European Appln. No. 22909697.9, mailed on Aug. 21, 2024, 10 pages.

Huang et al., "Risks and improvements of one-click login in online authentication," Science & Technology Vision, 2016, (27): 109, 3 pages (with English abstract).

* cited by examiner

IMPLEMENTATION OF ONE-TOUCH LOGIN SERVICE

CROSS-REFERENCE TO RELATED APPLICATIONS

This application is a continuation of PCT Application No. PCT/CN2022/135823, filed on Dec. 1, 2022, which claims priority to Chinese Patent Application No. 202111579026.2, filed on Dec. 22, 2021, and each application is hereby incorporated by reference in its entirety.

TECHNICAL FIELD

One or more embodiments of this specification relate to network information technologies, and in particular, to methods and apparatuses for implementing a one-touch login service.

BACKGROUND

With the rapid development of networks, various service applications are generated based on the networks. A user only needs to download an application client device, that is, an application (APP), of a corresponding service application from a terminal device, and perform registration and login by using the application client device to enjoy the corresponding service application, for example, watch a movie or buy a product.

To facilitate use of the user, a new method for logging in to an APP, that is, a one-touch login method, is currently available. In a one-touch login method, an authentication SDK is embedded in advance into an application client device that is usually a mobile phone. When the user requests to log in, the user communicates with an operator server by using the SDK to collect a mobile phone number of the user. After obtaining authorization from the user, the application client device obtains a token invoked by an interface, and transfers the token to an application server. The application server obtains, by using the token, information such as a mobile phone number of the user who grants the authorization to log in to the APP.

As shown in FIG. 1, in a one-touch login service, the user only needs to tap a related "one-touch login" key, and does not need to enter a mobile phone number, a user name, a password, an SMS verification code, etc. Therefore, the user can more conveniently and quickly complete a registration and login procedure, and the procedure that may originally require approximately 20 seconds is shortened to approximately 2 seconds, thereby significantly facilitating use of the user.

However, the security of the current one-touch login service is low, and consequently, private data of the user are easily disclosed. Therefore, a securer method for implementing a one-touch login service is required.

SUMMARY

Methods and apparatuses for implementing a one-touch login service are described in one or more embodiments of this specification, so that the security of a one-touch login service can be improved.

According to a first aspect, a method for implementing a one-touch login service is provided, including the following: obtaining information about a first IP address from a verification request sent by an application client device; sending a token to the application client device; obtaining information about a second IP address from a number acquisition request sent by an application server; and determining whether the first IP address is the same as the second IP address; and if the first IP address is the same as the second IP address, obtaining, based on a token carried in the number acquisition request, a mobile phone number of a terminal device in which the application client device is located, and sending the mobile phone number to the application server; or if the first IP address is different from the second IP address, refusing to send the mobile phone number of the terminal device to the application server.

The verification request includes at least one of the following requests: a login verification request that carries an APP ID, an APP sign, a KEY ID, a timestamp, and the IP address; a mobile phone identity verification request that carries an APP ID, the IP address, and a timestamp; and a newly defined verification request that carries an APP ID and the IP address.

When the verification request includes the mobile phone identity verification request that carries the APP ID, the information about the first IP address, and the timestamp, the sending the token to the application client device includes the following: performing identity verification based on the mobile phone identity verification request, and sending the token to the application client device after the identity verification succeeds.

Before the obtaining the information about the first IP address, the method further includes the following: receiving, by using an https link, a login verification request sent by the application client device, generating a symmetric key after login verification succeeds, and sending the symmetric key to the application client device by using the https link. The obtaining the information about the first IP address includes the following: decrypting, by using the generated symmetric key, the mobile phone identity verification request sent by the application client device, and obtaining the information about the first IP address from the decrypted mobile phone identity verification request. The sending the token to the application client device includes the following: encrypting the token by using the symmetric key, and sending the encrypted token to the application client device.

According to a second aspect, a method for implementing a one-touch login service is provided, including the following: adding information about an IP address of a terminal device to a verification request, and sending the verification request to an operator server; receiving a token sent by the operator server; sending the information about the IP address of the terminal device and the received token to an application server; and determining that one-touch login succeeds if login authorization sent by the application server is received.

The verification request includes at least one of the following requests: a login verification request that carries an APP ID, an APP sign, a KEY ID, a timestamp, and the IP address; a mobile phone identity verification request that carries an APP ID, the IP address, and a timestamp; and a newly defined verification request that carries an APP ID and the IP address.

Before the sending the mobile phone identity verification request to the operator server, the method further includes the following: sending a login verification request to the operator server by using an https link, and receiving, by using the https link, a symmetric key sent by the operator server. The sending the verification request to the operator server includes the following: encrypting the mobile phone identity verification request by using the symmetric key, and sending the encrypted mobile phone identity verification request to the operator server. The receiving the token sent by the operator server includes the following: receiving an encrypted token sent by the operator server, and decrypting the encrypted token by using the symmetric key to obtain the token.

According to a third aspect, a method for implementing a one-touch login service is provided, including the following: performing login pre-authorization after receiving a login request sent by an application client device; receiving a token sent by the application client device and information about an IP address of a terminal device in which the application client device is located; adding the received token and the information about the IP address to a number acquisition request, and sending the number acquisition request to an operator server; and if a mobile phone number, sent by the operator server, of the terminal device in which the application client device is located is received, performing login authorization based on the mobile phone number.

Information is exchanged with the operator server by using an https link.

According to a fourth aspect, an apparatus for implementing a one-touch login service is provided, including the following: a first IP address acquisition module, configured to obtain information about a first IP address from a verification request sent by an application client device; a token sending module, configured to send a token to the application client device; a second IP address acquisition module, configured to obtain information about a second IP address from a number acquisition request sent by an application server; and an authorization processing module, configured to determine whether the first IP address is the same as the second IP address, and if the first IP address is the same as the second IP address, obtain, based on a token carried in the number acquisition request, a mobile phone number of a terminal device in which the application client device is located, and send the mobile phone number to the application server, or if the first IP address is different from the second IP address, refuse to send the mobile phone number of the terminal device to the application server.

According to a fifth aspect, an apparatus for implementing a one-touch login service is provided, including the following: a verification request module, configured to add information about an IP address of a terminal device to a verification request, and send the verification request to an operator server; a token receiving module, configured to receive a token sent by the operator server; a forwarding module, configured to send the information about the IP address of the terminal device and the received token to an application server; and a login authorization module, configured to determine that one-touch login succeeds if login authorization sent by the application server is received.

According to a sixth aspect, an apparatus for implementing a one-touch login service is provided, including the following: a pre-login module, configured to receive a login request sent by an application client device, and perform login pre-authorization; a network factor acquisition module, configured to receive a token sent by the application client device and information about an IP address of a terminal device in which the application client device is located; a number acquisition module, configured to add the received token and the information about the IP address to a number acquisition request, and send the number acquisition request to an operator server; and an authorization execution module, configured to: if a mobile phone number, sent by the operator server, of the terminal device in which the application client device is located is received, perform login authorization based on the mobile phone number.

According to a seventh aspect, a computing device is provided, including a memory and a processor. The memory stores executable code, and when executing the executable code, the processor implements the method described in any embodiment of this specification.

The methods and apparatuses for implementing a one-touch login service provided in the embodiments of this specification can prevent an application server from providing a corresponding application service for a terminal device of an attacker, and improve the security.

BRIEF DESCRIPTION OF DRAWINGS

To describe the technical solutions in the embodiments of this specification or in the existing technology more clearly, the following briefly describes the accompanying drawings needed for describing the embodiments or the existing technology. Clearly, the accompanying drawings in the following descriptions show some embodiments of this application, and a person of ordinary skill in the art can still derive other drawings from these accompanying drawings without creative efforts.

DESCRIPTION OF EMBODIMENTS

Solutions provided in this specification are described below with reference to the accompanying drawings.

Figure 1:
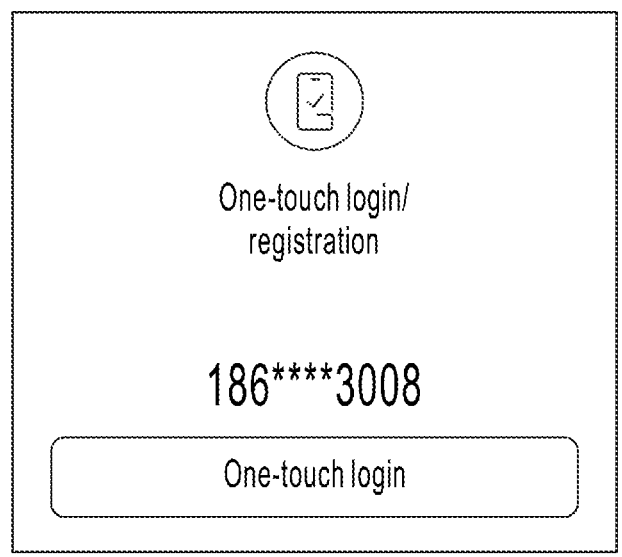
FIG. 1 is a schematic diagram illustrating an operation of a one-touch login service.
Figure 2:
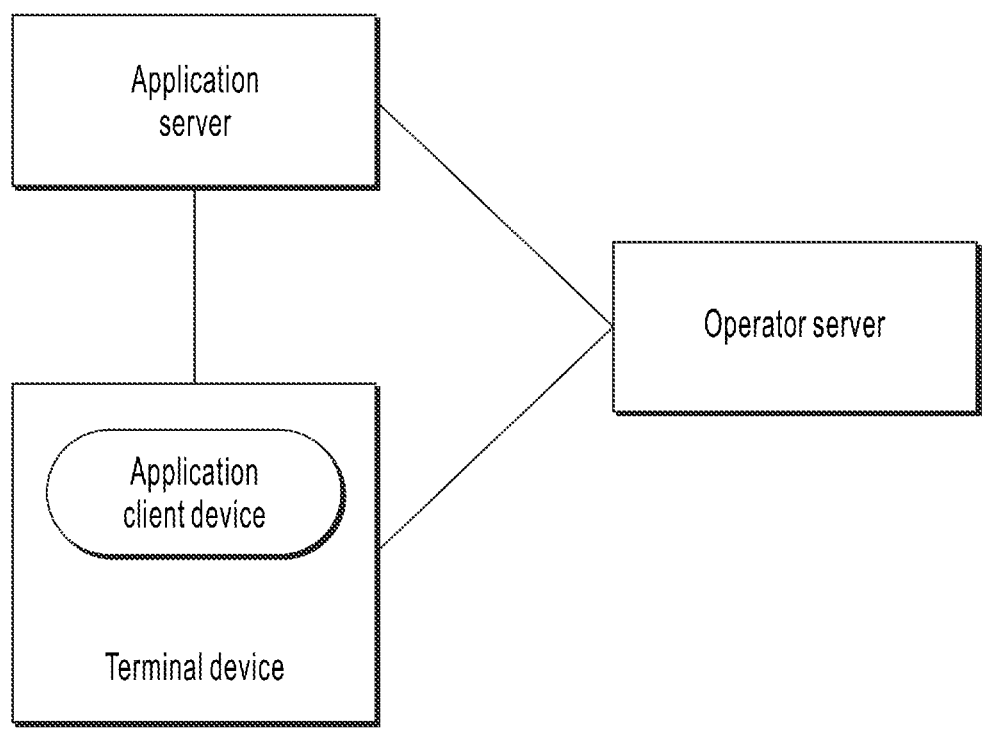
FIG. 2 is a schematic diagram illustrating a system architecture to which an embodiment of this specification is applied.

To facilitate understanding of the methods provided in this specification, a system architecture involved in and applicable to this specification is described first. As shown in FIG. 2, the system architecture mainly includes three network nodes: an application client device, an application server, and an operator server.

The application client device is installed on and runs in a terminal device, and the terminal device can include but is not limited to an intelligent mobile terminal, a smart household device, a network device, a wearable device, a smart medical device, a personal computer (PC), etc. The intelligent mobile terminal can include a mobile phone, a tablet computer, a notebook computer, a personal digital assistant (PDA), an Internet vehicle, etc. The smart household device can include a smart appliance device, such as a smart TV, a smart air conditioner, a smart water heater, a smart refrigerator, a smart air purifier, etc. The smart household device can further include a smart door lock, a smart socket, a smart light, a smart camera, etc. A network device can include a switch, a wireless AP, a server, etc. The wearable device can include a smart watch, smart glasses, a smart band, a virtual reality device, an augmented reality device, a hybrid reality device (that is, a device that can support virtual reality and augmented reality), etc. The smart medical device can include a smart thermometer, a smart blood pressure monitor, a smart blood glucometer, etc.

The application client device can be various types of applications, including but not limited to a payment application, a multimedia playback application, a map application, a text editing application, a financial application, a browser application, an instant messaging application, etc.

The operator server is a server-end device of a provider that provides a network service, and can be a single server or a server group including multiple servers. The operator server is responsible for providing network services for various applications, for example, performing security authentication and providing a mobile phone number for one-touch login.

The application server is a specific application server, and specifically provides a corresponding application service for the application client device. For example, for an application client device such as Alipay, the application server is a server that provides an Alipay service.

It should be understood that a quantity of application client devices, a quantity of application servers, and a quantity of operator servers in FIG. 2 are merely examples. Any quantity can be selected and disposed based on implementation needs.

As shown in FIG. 2, the application client device, the application server, and the operator server interact with each other via a network. The network can include various connection types, such as a wired or wireless communication link or an optical fiber cable.

A method for implementing a one-touch login service provided in this specification relates to three network nodes shown in FIG. 2. Therefore, processing performed by the operator server, processing performed by the application client device, and processing performed by the application server in a one-touch login service are separately described below by using different embodiments.

First, processing performed by the operator server in the one-touch login service is described.

Figure 3:
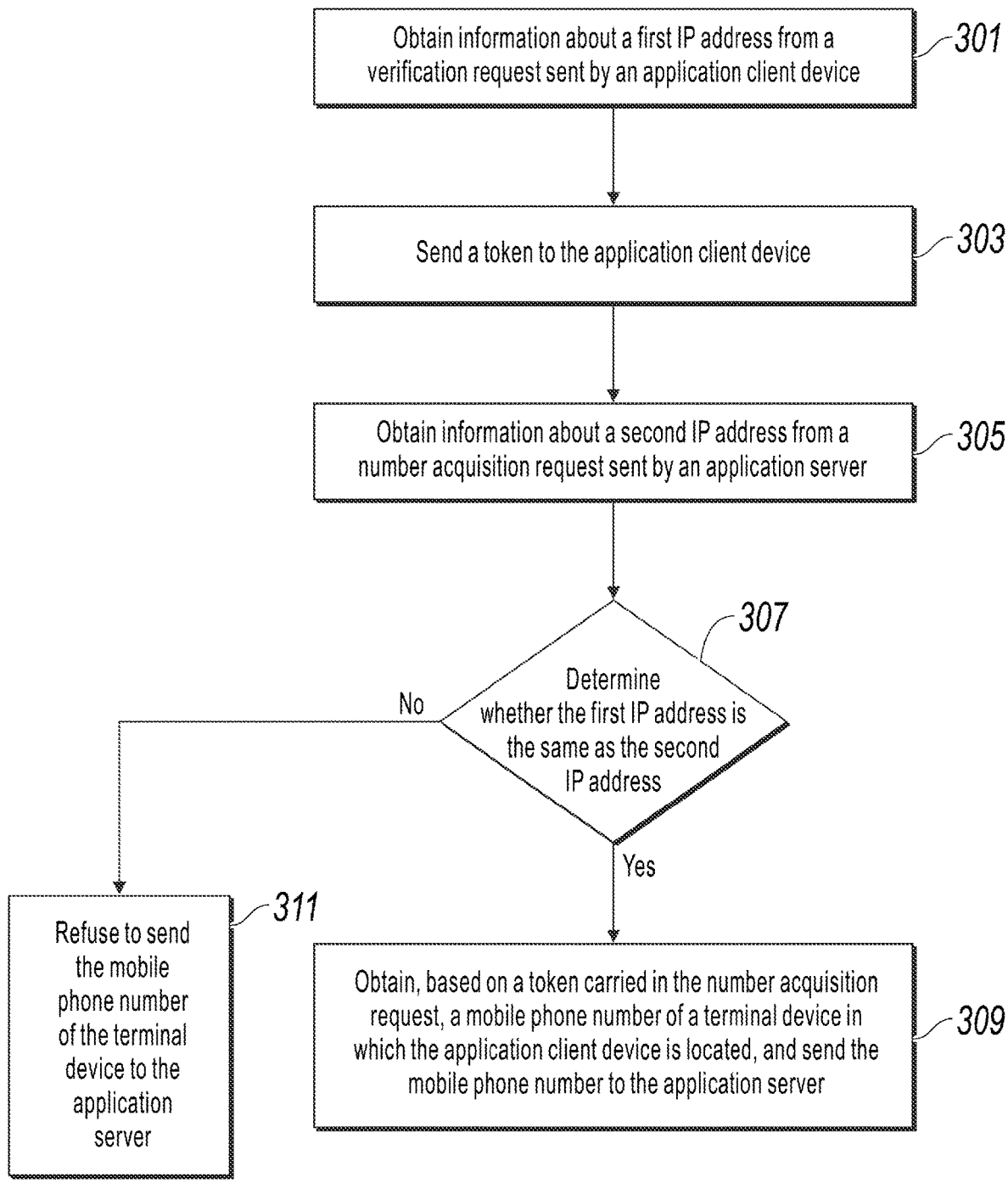
FIG. 3 is a flowchart illustrating a method for implementing a one-touch login service on an operator server, according to an embodiment of this specification.

FIG. 3 is a flowchart illustrating a method for implementing a one-touch login service on an operator server, according to an embodiment of this specification. As shown in FIG. 3, the method includes the following steps.

Step 301: Obtain information about a first IP address from a verification request sent by an application client device.

Step 303: Send a token to the application client device.

Step 305: Obtain information about a second IP address from a number acquisition request sent by an application server.

Step 307: Determine whether the first IP address is the same as the second IP address, and if the first IP address is the same as the second IP address, perform step 309, or if the first IP address is different from the second IP address, perform step 311.

Step 309: Obtain, based on a token carried in the number acquisition request, a mobile phone number of a terminal device in which the application client device is located, and send the mobile phone number to the application server.

Step 311: Refuse to send the mobile number of the terminal device to the application server.

In an existing one-touch login service, the following cases may occur: An attacker uses a terminal device X to steal a token to be sent to an application client device; after that, the attacker pretends, by using the terminal device X, to be a terminal device Y in which the application client device is located to send the token to the application server. Because the used token is correct, the application server can obtain, from an operator server, a mobile phone number of the terminal device Y in which the application client device is located, and consequently, the application server mistakenly considers that the terminal device X that sends the token is the terminal device Y in which the application client device is located, that is, considers that the attacker is an authorized user of the application client device, and therefore provides a corresponding application service for the attacker, for example, playing video information that only the authorized user has the permission to watch or transferring money, thereby causing a security problem to use of the user and causing the leakage of private data of the user.

It can be determined from the process shown in FIG. 3 that the operator server obtains, before sending the token, the first IP address sent by the application client device (the first IP address corresponds to an IP address of a terminal device that requests one-touch login from the operator server before the token is sent, for example, the first IP address is denoted as an IP address of the terminal device Y), and obtains, after sending the token, the second IP address sent by the application server (the second IP address corresponds to an IP address of a terminal device that requests one-touch login by using the application server after the token is sent). If the two IP addresses are the same, it can be considered that in a one-touch login service, a terminal device that communicates with the operator server before the token is sent and a terminal device that communicates with the application server after the token is sent are the same terminal device, and are the terminal device Y, that is, a terminal device that currently performs the one-touch login service with the application server (that is, a terminal device that sends the token to the application server) is the terminal device Y used by the authorized user, and the sent token is not stolen by the attacker, and no attack behavior occurs. Therefore, the operator server can provide the mobile phone number of the terminal device Y in which the application client device is located for the application server, so that the application server provides a corresponding application service for the terminal device Y that is currently connected to the application server. On the contrary, if the two IP addresses are different, it can be considered that in a one-touch login service, the terminal device Y that communicates with the operator server before the token is sent and the terminal device X that communicates with the application server after the token is sent are not the same terminal device, that is, the terminal device X that is currently connected to the application server is not the terminal device Y used by the authorized user, but the terminal device X used by an attacker who has stolen the token, and attack behavior has occurred. Therefore, the operator server does not provide, for the application server, the mobile phone number of the terminal device Y in which the application client device is located, so that the application server cannot provide a corresponding application service for the terminal device X of the attacker that is currently connected to the application server. It can be determined that the method in this embodiment of this specification prevents the application server from providing a corresponding application service of the application client device for a terminal device of an attacker, and improves the security.

The process shown in FIG. 3 is described below with reference to a specific embodiment.

First, for step 301, the operator server obtains the information about the first IP address from the verification request sent by the application client device.

It can be understood that the application client device sends the verification request to the operator server by using the terminal device Y in which the application client device is located, and the verification request carries an IP address of the terminal device Y, which is denoted as the first IP address.

The verification request that carries the first IP address can include any one or more of the following: Verification request 1: In a one-touch login service, before the operator server sends the token, the application client device sends a login verification request to the operator server so as to verify the identity of the application client device. Therefore, the login verification request can carry the IP address of the terminal device and is sent to the operator server. Correspondingly, the verification request in step 301 can be a login verification request that carries an APP ID, an APP sign, a KEY ID, a timestamp, and the first IP address.

Verification request 2: In a one-touch login service, before the operator server sends the token, the application client device sends a mobile phone identity verification request to the operator server to verify the identity of the terminal device in which the application client device is located. Therefore, the mobile phone identity verification request can be used to carry the first IP address, and is sent to the operator server. Correspondingly, the verification request in step 301 can be a mobile phone identity verification request that carries an APP ID, the first IP address, and a timestamp.

Verification request 3: Before the operator server sends the token, the application client device can send the first IP address to the operator server by using a newly defined verification request. Correspondingly, the verification request in step 301 can be a newly defined verification request that carries an APP ID and the first IP address.

The verification request in step 301 is the verification request 2, that is, the mobile phone identity verification request that carries the APP ID, the first IP address, and the timestamp. In this case, to improve the security and avoid leakage of the first IP address of the terminal device Y and other information, encryption processing can be performed. Specifically, before step 301, the operator server receives, by using an https link, a login verification request sent by the application client device. After login verification succeeds, the operator server generates a symmetric key, and sends the symmetric key to the application client device by using the https link. In this way, the application client device encrypts, by using the symmetric key, the mobile phone identity verification request that carries the APP ID, the first IP address, and the timestamp, and then sends the encrypted mobile phone identity verification request to the operator server. Correspondingly, an implementation process of step 301 includes the following: The operator server decrypts, by using the symmetric key, the mobile phone identity verification request sent by the application client device, and obtains the information about the first IP address from the decrypted mobile phone identity verification request.

Next, for step 303, the operator server sends the token to the application client device.

Here, after receiving the mobile phone identity verification request, the operator server performs identity verification based on the mobile phone identity verification request, and sends the token to the application client device after the identity verification succeeds.

As described above, if the operator server generates the symmetric key, in step 303, the operator server encrypts the token by using the symmetric key, and sends the encrypted token to the application client device to prevent leakage of the token as far as possible.

After the application client device obtains the token, if the token is encrypted, the application client device can decrypt the encrypted token by using the pre-obtained symmetric key to obtain the token. After the application client device obtains the token, the application client device can send the token to the application server. In addition, for subsequent validity verification, the application client device also denotes the IP address of the terminal device in which the application client device is located as the second IP address, and also sends the second IP address to the application server. The application server adds the received token and the second IP address to the number acquisition request, and sends the number acquisition request to the operator server.

Next, for step 305, the information about the second IP address is obtained from the number acquisition request sent by the application server.

When this step is performed, the operator server obtains two IP addresses from the application client device and the application server.

Next, in step 307 to step 311, as described above, the operator server determines whether the two IP addresses are the same. If the two IP addresses are the same, it can be considered that, in a one-touch login service, a terminal device that communicates with the operator server before the token is sent and a terminal device that communicates with the application server after the token is sent are the same terminal device, and are the terminal device Y, that is, a terminal device that currently performs a one-touch login service with the application server is the terminal device Y used by the authorized user. Therefore, the operator server can provide, for the application server, the mobile phone number of the terminal device Y in which the application client device is located, so that the application server provides a corresponding application service for the terminal device Y that is currently connected to the application server. On the contrary, if the two IP addresses are different, it can be considered that in a one-touch login service, the terminal device Y that communicates with the operator server before the token is sent and the terminal device X that communicates with the application server after the token is sent are not the same terminal device, that is, the terminal device X that is currently connected to the application server is not the terminal device Y used by the authorized user, but the terminal device X used by an attacker who has stolen the token, and attack behavior has occurred. Therefore, the operator server does not provide, for the application server, the mobile phone number of the terminal device Y in which the application client device is located, so that the application server cannot provide a corresponding application service for the terminal device X that is currently connected to the application server. It can be determined that the method in this embodiment of this specification prevents the application server from providing a corresponding application service of the application client device for a terminal device of an attacker, and improves the security.

It should be noted that, in this embodiment of this specification, the IP address can be either or two of an Internet Protocol Version 4 (IPv4) address and an Internet Protocol Version 6 (IPv6) address.

In embodiments of this specification, the application client device can communicate with the application server by using a dedicated link. Before the symmetric key is obtained, the application client device can communicate with the operator server by using an https link. After the symmetric key is obtained, the application client device can communicate with the operator server by using the http link. The application server can communicate with the operator server by using the https link.

Processing performed by the application client device in the one-touch login service is described below.

Figure 4:
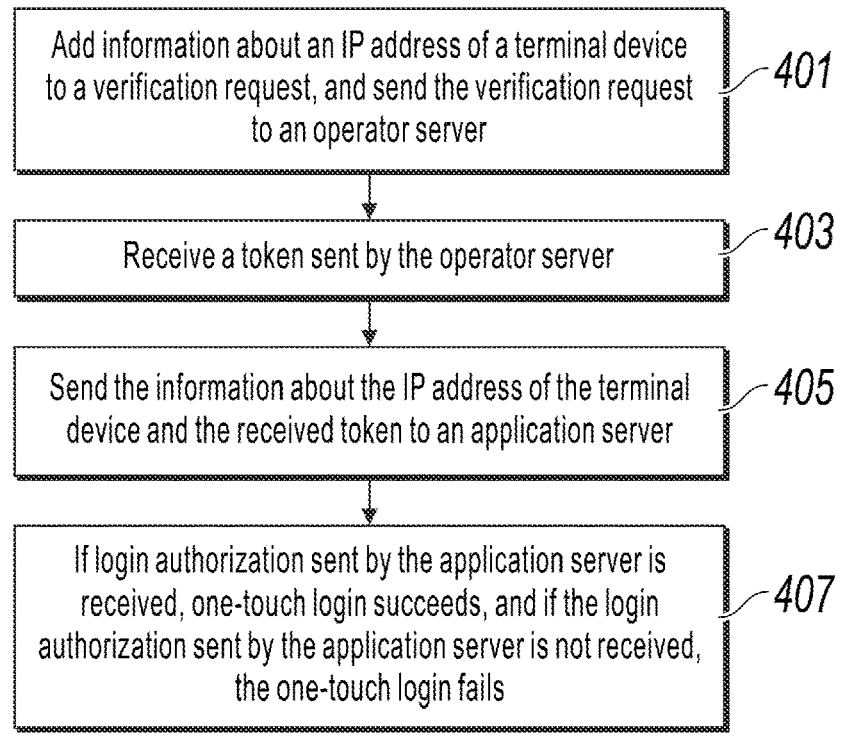
FIG. 4 is a flowchart illustrating a method for implementing a one-touch login service on an application client device, according to an embodiment of this specification.

FIG. 4 is a flowchart illustrating a method for implementing a one-touch login service on an application client device, according to an embodiment of this specification. As shown in FIG. 4, the method includes the following: Step 401: Add information about an IP address of a terminal device to a verification request, and send the verification request to an operator server.

For descriptions of specific implementation of step 401, reference can be made to all the previous descriptions of step 301.

For example, the verification request in step 401 includes at least one of the following requests: a login verification request that carries an APP ID, an APP sign, a KEY ID, a timestamp, and the IP address; a mobile phone identity verification request that carries an APP ID, the IP address, and a timestamp; and a newly defined verification request that carries an APP ID and the IP address.

For another example, in a implementation, the verification request is the mobile phone identity verification request that carries the APP ID, the information about the IP address of the terminal device, and the timestamp. In this case, before the sending the mobile phone identity verification request to the operator server, the method further includes the following: The application client device sends a login verification request to the operator server by using an https link, and receives, by using the https link, a symmetric key sent by the operator server. In step 401, the application client device encrypts the mobile phone identity verification request by using the symmetric key, and sends the encrypted mobile phone identity verification request to the operator server. In step 403, a token sent by the operator server is received.

For descriptions of specific implementation of step 403, reference can be made to all the previous descriptions of step 303. For example, the application client device receives an encrypted token sent by the operator server, and decrypts the encrypted token by using the symmetric key to obtain the token.

Step 405: Send the information about the IP address of the terminal device and the received token to an application server.

To perform validity verification on the operator server, when sending the token to the application server, the application client device needs to add the IP address of the terminal device in which the application client device is located.

Step 407: If login authorization sent by the application server is received, one-touch login succeeds, and if the login authorization sent by the application server is not received, the one-touch login fails.

Processing performed by the application server in the one-touch login service is described below.

Figure 5:
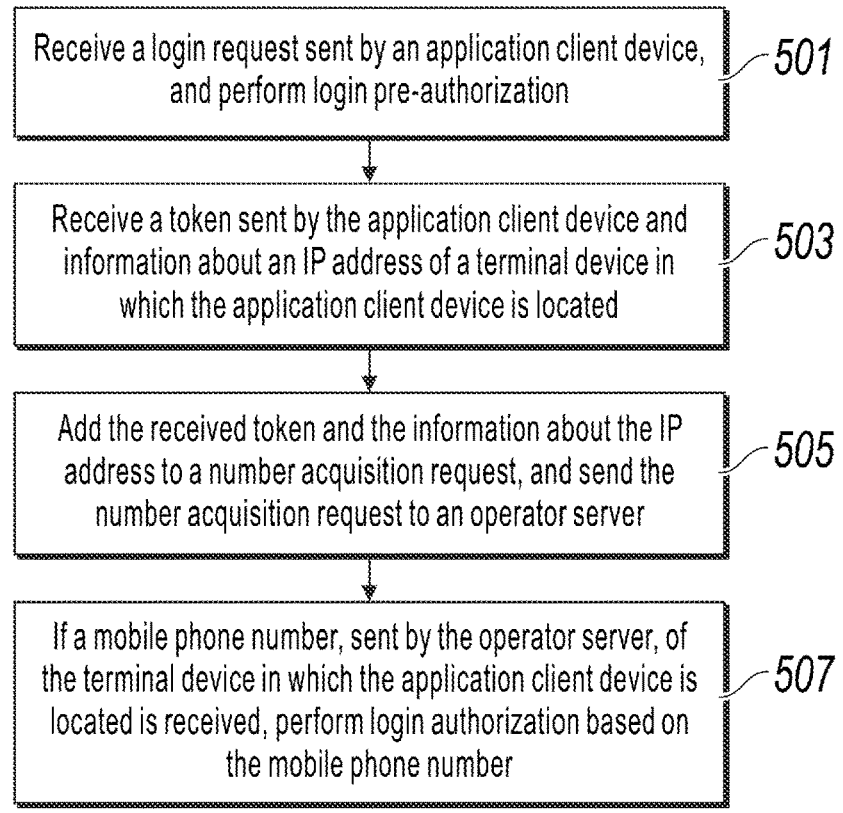
FIG. 5 is a flowchart illustrating a method for implementing a one-touch login service on an application server, according to an embodiment of this specification.

FIG. 5 is a flowchart illustrating a method for implementing a one-touch login service on an application server, according to an embodiment of this specification. As shown in FIG. 5, the method includes the following: Step 501: Receive a login request sent by an application client device, and perform login pre-authorization.

When an application client device needs to use a one-touch login service, the application client device first sends a login request to the application server to trigger start of the one-touch login service. The application server performs login pre-authorization, for example, sends a pre-login interface to the application client device. Then, the application client device performs step 401 to step 405. For details, reference can be made to all related descriptions of step 401 to step 405.

Step 503: Receive a token sent by the application client device and information about an IP address of a terminal device in which the application client device is located.

Here, if the token is not stolen by an attacker, a terminal device that communicates with the application server in step 503 and the terminal device in step 501 are the same terminal device, for example, denoted as a terminal device Y. In step 503, the application server receives an IP address of the terminal device Y.

On the contrary, if the token is stolen by the attacker, the terminal device that communicates with the application server in step 503 and the terminal device in step 501 are not the same terminal device. For example, the terminal device that performs communication in step 503 is denoted as a terminal device X. In step 503, the application server receives an IP address of the terminal device X.

Step 505: Add the received token and the information about the IP address to a number acquisition request, and send the number acquisition request to an operator server.

In step 505, the application server can send the number acquisition request to the operator server by using an https link.

For processing performed after the operator server receives the number acquisition request, reference can be made to all the previous descriptions of step 305 to step 311.

Step 507: If a mobile phone number, sent by the operator server, of the terminal device in which the application client device is located is received, perform login authorization based on the mobile phone number.

Figure 6:
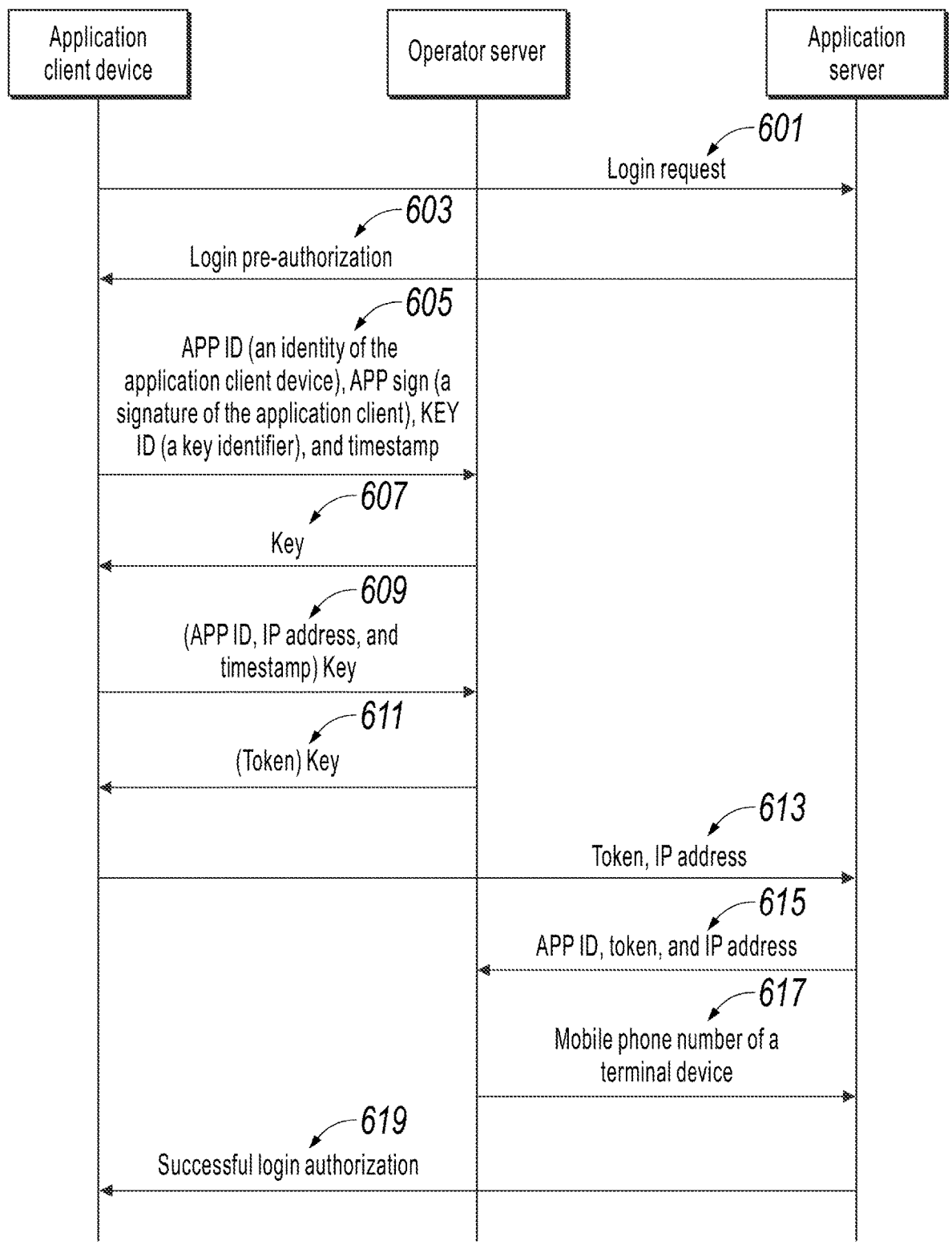
FIG. 6 is a flowchart illustrating a method in which an operator server, an application client device, and an application server cooperate to implement a one-touch login server, according to an embodiment of this specification.

A method for implementing a one-touch login service is described below with reference to cooperated processing of the application client device, the application server, and the operator server. In this method, before the operator server sends a token, as an example for description, the application client device uses the previous verification request 2, that is, the mobile phone identity verification request, to carry the IP address of the terminal device. As shown in FIG. 6, the method includes the following steps.

Step 601: The application client device sends, by using a dedicated link, a login request to an application server that the application client device belongs to.

In step 601, the application client device is an application (APP) installed in a terminal device. The application client device can send the login request in this step after being triggered by a user.

There is a dedicated link between the application client device and the application server. Therefore, the login request can be sent by using the dedicated link instead of a public network.

Step 603: After receiving the login request, the application server performs login pre-authorization, including the following: sending a pre-login interface to the application client device by using the dedicated link.

Step 605: The application server sends a login verification request to an operator server by using an https link.

Here, the https link is an encrypted link, and sending the login verification request by using the https link can further improve the security.

In step 605, the login verification request can include information such as an application client device identifier (APP ID), an application client device signature (APP sign), a key identifier (KEY ID), and a timestamp.

Step 607: The operator server performs authentication on an identity of the application client device based on the received login verification request, and after the authentication succeeds, generates a session key and sends the key to the application client device by using the https link.

Here, the key is a symmetric key.

Step 609: The application client device generates a mobile phone identity verification request that carries an APP ID, an IP address of a terminal device in which the application client device is located, and a timestamp, encrypts the mobile phone identity verification request by using the symmetric key, and sends the encrypted mobile phone identity verification request to the operator server by using the http link.

Here, the IP address of the terminal device in which the application client device is located that is carried in the mobile phone identity verification request can include an IPv4 address and an IPv6 address.

Step 611: The operator server decrypts the mobile phone identity verification request by using the key, performs identity verification, obtains information about a first IP address from the mobile phone identity verification request after the identity verification succeeds, encrypts a token by using the symmetric key, and sends the encrypted token to the application client device.

Here, the operator server stores the IP address, obtained before the token is sent, of the terminal device in which the application client device is located, and the IP address is denoted as the first IP address.

Step 613: After decrypting the token by using the symmetric key, the application client device sends the token and the IP address of the terminal device in which the application client device is located to the application server by using a dedicated link.

Step 615: The application server adds an APP ID, the received token, and the IP address to a number acquisition request, and sends the number acquisition request to the operator server by using the https link.

Step 617: The operator server determines whether an IP address (recorded as a second IP address) sent by the application server is the same as the previously obtained first IP address, and if the second IP address is the same as the first IP address, the operator server sends, to the application server by using the https link, a mobile phone number of the terminal device that is queried from a gateway, or otherwise, current one-touch login fails.

For example, when one-touch login fails, the operator server returns a number acquisition failure message to the application server.

Step 619: If the application server receives the mobile phone number, sent by the operator server, of the terminal device in which the application client device is located, the application server performs successful login authorization on the application client device based on the mobile phone number by using the dedicated link.

Figure 7:
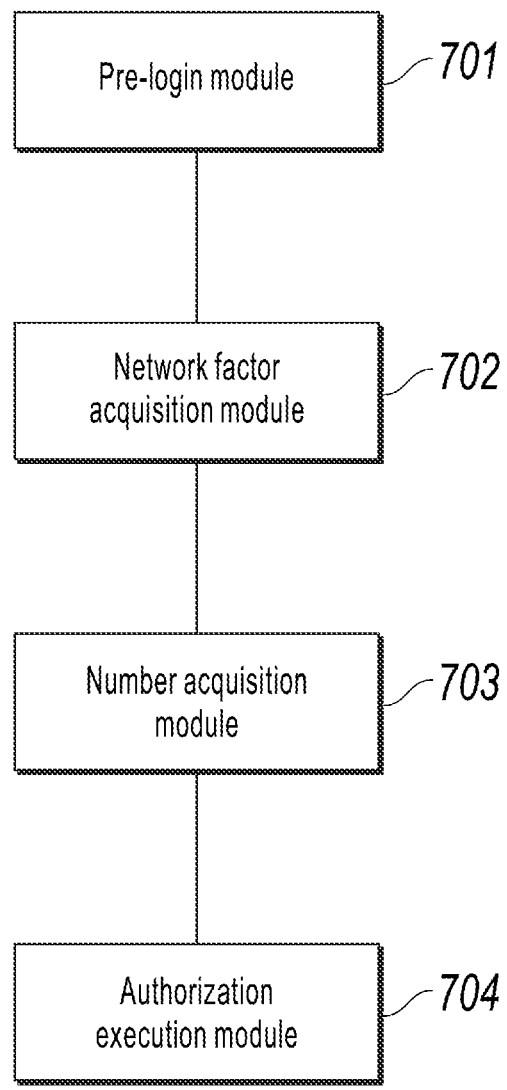
FIG. 7 is a schematic diagram illustrating a structure of a one-touch login service apparatus, according to an embodiment of this specification.

In an embodiment of this specification, an apparatus for implementing a one-touch login service is provided, and is disposed in an operator server. As shown in FIG. 7, the apparatus includes the following: a first IP address acquisition module 701, configured to obtain information about a first IP address from a verification request sent by an application client device; a token sending module 702, configured to send a token to the application client device; a second IP address acquisition module 703, configured to obtain information about a second IP address from a number acquisition request sent by an application server; and an authorization processing module 704, configured to determine whether the first IP address is the same as the second IP address, and if the first IP address is the same as the second IP address, obtain, based on a token carried in the number acquisition request, a mobile phone number of a terminal device in which the application client device is located, and send the mobile phone number to the application server, or if the first IP address is different from the second IP address, refuse to send the mobile phone number of the terminal device to the application server.

In an embodiment of this specification, the first IP address acquisition module 701 is configured to obtain the first IP address from any one or more of the following requests: a login verification request that carries an APP ID, an APP sign, a KEY ID, a timestamp, and the first IP address; a mobile phone identity verification request that carries an APP ID, the first IP address, and a timestamp; and a newly defined verification request that carries an APP ID and the first IP address.

In an embodiment of this specification, the verification request is the mobile phone identity verification request that carries the APP ID, the information about the first IP address, and the timestamp. The first IP address acquisition module 701 is configured to obtain the information about the first IP address from the mobile phone identity verification request. The token sending module 702 is configured to perform identity verification based on the mobile phone identity verification request, and send the token to the application client device after the identity verification succeeds.

In an embodiment of this specification, the apparatus for implementing a one-touch login service that is applied to the operator server further includes the following: a login verification module, configured to receive, by using an https link, a login verification request sent by the application client device, and perform login verification based on the login verification request; and a key generation module, configured to generate a symmetric key after the verification performed by the login verification module succeeds, and send the symmetric key to the application client device by using the https link. The first IP address acquisition module 701 is configured to decrypt, by using the generated symmetric key, the mobile phone identity verification request sent by the application client device, and obtain the information about the first IP address from the decrypted mobile phone identity verification request. The token sending module 702 is configured to encrypt the token by using the symmetric key, and send the encrypted token to the application client device.

Figure 8:
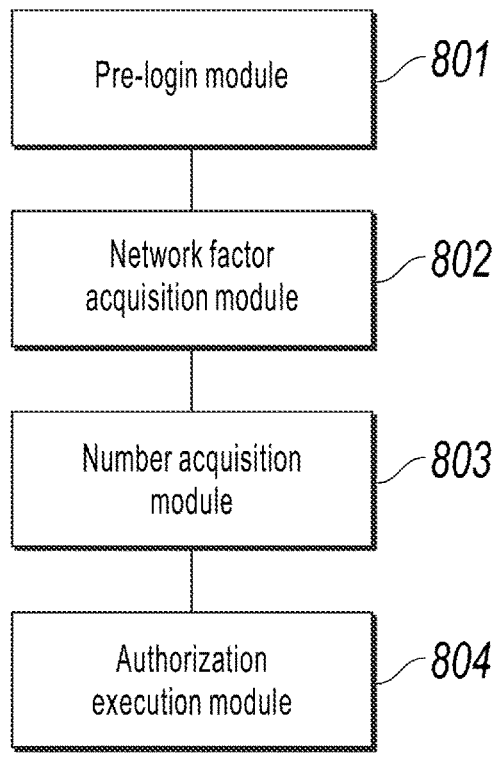
FIG. 8 is a schematic diagram illustrating a structure of a one-touch login service apparatus, according to another embodiment of this specification.

In an embodiment of this specification, an apparatus for implementing a one-touch login service is provided, and is disposed in an application client device. As shown in FIG. 8, the apparatus includes the following: a verification request module 801, configured to add information about an IP address of a terminal device in which the application client device is located to a verification request, and send the verification request to an operator server; a token receiving module 802, configured to receive a token sent by the operator server; a forwarding module 803, configured to send the information about the IP address of the terminal device in which the application client device is located and the received token to an application server; and a login authorization module 804, configured to determine that one-touch login succeeds if login authorization sent by the application server is received.

In an embodiment of this specification, the verification request module 801 is configured to send any one or more of the following requests to the operator server: a login verification request that carries an APP ID, an APP sign, a KEY ID, a timestamp, and the first IP address; a mobile phone identity verification request that carries an APP ID, the first IP address, and a timestamp; and a newly defined verification request that carries an APP ID and the first IP address.

In an embodiment of this specification, when the verification request module 801 sends the mobile phone identity verification request that carries the APP ID, the first IP address, and the timestamp, the apparatus for implementing a one-touch login service that is applied to the application client device further includes the following: a login request module, configured to send a login verification request to the operator server by using an https link, and receive, by using the https link, a symmetric key sent by the operator server. The verification request module 801 is configured to encrypt the mobile phone identity verification request by using the symmetric key, and send the encrypted mobile phone identity verification request to the operator server. The token receiving module 802 is configured to receive the encrypted token sent by the operator server, and decrypt the encrypted token by using the symmetric key to obtain the token.

Figure 9:
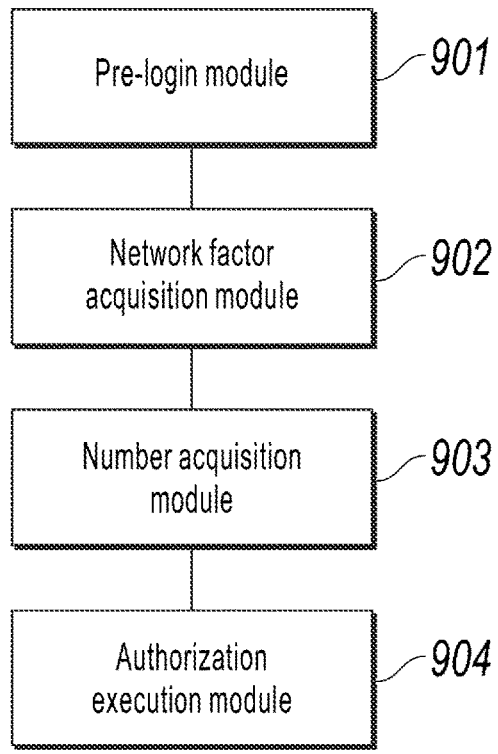
FIG. 9 is a schematic diagram illustrating a structure of a one-touch login service apparatus, according to still another embodiment of this specification.

In an embodiment of this specification, an apparatus for implementing a one-touch login service is provided, and is disposed in an application server. As shown in FIG. 9, the apparatus includes the following: a pre-login module 901, configured to perform login preprocessing after a login request sent by an application client device is received; a network factor acquisition module 902, configured to receive a token sent by the application client device and information about an IP address of a terminal device in which the application client device is located; a number acquisition module 903, configured to add the received token and the information about the IP address to a number acquisition request, and send the number acquisition request to an operator server; and an authorization execution module 904, configured to: if a mobile phone number of the terminal device in which the application client device is located is received, perform login authorization based on the mobile phone number.

In an embodiment of this specification, the number acquisition module 903 is configured to send the number acquisition request to the operator server by using an https link. The authorization execution module 904 is configured to receive, by using the https link, the mobile phone number of the terminal device in which the application client device is located that is sent by the operator server.

One implementation of this specification provides a computer-readable storage medium. The computer-readable storage medium stores a computer program. When the computer program is executed on a computer, the computer is enabled to perform the method in any implementation in this specification.

One implementation of this specification provides a computing device, including a memory and a processor. The memory stores executable code, and when executing the executable code, the processor implements the method in any implementation in this specification.

It can be understood that a structure shown in embodiments of this specification does not constitute a specific limitation on the apparatus in the embodiments of this specification. In other embodiments of this specification, the apparatus can include more or fewer components than those shown in the figure, or can combine some components, or can split some components, or can have different component arrangements. The components shown in the figure can be implemented by hardware, software, or a combination of software and hardware.

Content such as information exchange and execution processes between modules in the apparatus and the system is based on a same concept as that in the method embodiment of this specification. For specific content, reference can be to the descriptions in the method embodiment of this specification. Details are omitted here.

The embodiments in this specification are described in a progressive way. For same or similar parts of the embodiments, reference can be made to the embodiments mutually. Each embodiment focuses on a difference from other embodiments. In particular, the apparatus embodiment is basically similar to the method embodiment, and therefore is described briefly. For related parts, references can be made to related descriptions in the method embodiment.

A person skilled in the art should be aware that in the previous one or more examples, functions described in this application can be implemented by hardware, software, widget, or any combination thereof. When being implemented by software, these functions can be stored in a computer-readable medium or transmitted as one or more instructions or codes in the computer-readable medium.

The specific implementations mentioned above provide further detailed explanations of the objectives, technical solutions, and beneficial effects of this application. It should be understood that the previously mentioned descriptions are merely specific implementations of this application and are not intended to limit the protection scope of this application. Any modifications, equivalent replacements, improvements, etc. made on the basis of the technical solutions of this application shall all fall within the protection scope of this application.

What is claimed is:

1. A computer-implemented method for implementing a one-touch login service, comprising:
    receiving a verification request from an application client device, wherein the verification request is encrypted using a symmetric key;
    obtaining, using the symmetric key, information about a first IP address from the verification request;
    sending an encrypted token to the application client device, wherein the encrypted token comprises a token that is encrypted using the symmetric key;
    obtaining information about a second IP address from a number acquisition request sent by an application server; and
    determining whether the first IP address is the same as the second IP address; and
    if the first IP address is the same as the second IP address:
        obtaining, based on a token carried in the number acquisition request, a mobile phone number of a terminal device in which the application client device is located; and
        sending the mobile phone number to the application server; or
    if the first IP address is different from the second IP address:
        refusing to send the mobile phone number of the terminal device to the application server.

2. The computer-implemented method of claim 1, wherein the verification request comprises at least one of:

a login verification request that carries an APP ID, an APP sign, a KEY ID, a timestamp, and the first IP address;
a mobile phone identity verification request that carries an APP ID, the first IP address, and a timestamp; and
a newly defined verification request that carries an APP ID and the first IP address.

3. The computer-implemented method of claim 2, wherein when the verification request comprises the mobile phone identity verification request that carries the APP ID, the information about the first IP address, and the timestamp:
before obtaining the information about the first IP address:
receiving, by using an https link, a login verification request sent by the application client device;
generating, as a generated symmetric key, a symmetric key after login verification succeeds; and
sending the symmetric key to the application client device by using the https link.

4. The computer-implemented method of claim 3, wherein obtaining the information about the first IP address comprises:
decrypting, by using the generated symmetric key and as a decrypted mobile phone identity verification request, the mobile phone identity verification request sent by the application client device.

5. The computer-implemented method of claim 4, obtaining the information about the first IP address, comprises
obtaining the information about the first IP address from the decrypted mobile phone identity verification request.

6. The computer-implemented method of claim 3, wherein before obtaining the information about the first IP address, the computer-implemented method further comprises:
receiving a login request from the application client device using a dedicated link; and
performing login pre-authorization after receiving the login request.

7. The computer-implemented method of claim 6, wherein performing the login pre-authorization comprises sending a pre-login interface to the application client device using the dedicated link.

8. A non-transitory, computer-readable medium storing one or more instructions executable by a computer system to perform one or more operations for implementing a one-touch login service, comprising:
receiving a verification request from an application client device, wherein the verification request is encrypted using a symmetric key;
obtaining, using the symmetric key, information about a first IP address from the verification request;
sending an encrypted token to the application client device, wherein the encrypted token comprises a token that is encrypted using the symmetric key;
obtaining information about a second IP address from a number acquisition request sent by an application server; and
determining whether the first IP address is the same as the second IP address; and
if the first IP address is the same as the second IP address:
obtaining, based on a token carried in the number acquisition request, a mobile phone number of a terminal device in which the application client device is located; and
sending the mobile phone number to the application server; or
if the first IP address is different from the second IP address:
refusing to send the mobile phone number of the terminal device to the application server.

9. The non-transitory, computer-readable medium of claim 8, wherein the verification request comprises at least one of:
a login verification request that carries an APP ID, an APP sign, a KEY ID, a timestamp, and the first IP address;
a mobile phone identity verification request that carries an APP ID, the first IP address, and a timestamp; and
a newly defined verification request that carries an APP ID and the first IP address.

10. The non-transitory, computer-readable medium of claim 9, wherein when the verification request comprises the mobile phone identity verification request that carries the APP ID, the information about the first IP address, and the timestamp:
before obtaining the information about the first IP address:
receiving, by using an https link, a login verification request sent by the application client device;
generating, as a generated symmetric key, a symmetric key after login verification succeeds; and
sending the symmetric key to the application client device by using the https link.

11. The non-transitory, computer-readable medium of claim 10, wherein obtaining the information about the first IP address comprises:
decrypting, by using the generated symmetric key and as a decrypted mobile phone identity verification request, the mobile phone identity verification request sent by the application client device.

12. The non-transitory, computer-readable medium of claim 11, obtaining the information about the first IP address, comprises
obtaining the information about the first IP address from the decrypted mobile phone identity verification request.

13. The non-transitory, computer-readable medium of claim 10, wherein before obtaining the information about the first IP address, the one or more operations further comprise:
receiving a login request from the application client device using a dedicated link; and
performing login pre-authorization after receiving the login request.

14. The non-transitory, computer-readable medium of claim 13, wherein performing the login pre-authorization comprises sending a pre-login interface to the application client device using the dedicated link.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for implementing a one-touch login service, comprising:
receiving a verification request from an application client device, wherein the verification request is encrypted using a symmetric key;
obtaining, using the symmetric key, information about a first IP address from the verification request;
sending an encrypted token to the application client device, wherein the encrypted token comprises a token that is encrypted using the symmetric key;

obtaining information about a second IP address from a number acquisition request sent by an application server; and determining whether the first IP address is the same as the second IP address; and if the first IP address is the same as the second IP address:
  obtaining, based on a token carried in the number acquisition request, a mobile phone number of a terminal device in which the application client device is located; and
  sending the mobile phone number to the application server; or if the first IP address is different from the second IP address:
  refusing to send the mobile phone number of the terminal device to the application server.

16. The computer-implemented system of claim 15, wherein the verification request comprises at least one of:
  a login verification request that carries an APP ID, an APP sign, a KEY ID, a timestamp, and the first IP address;
  a mobile phone identity verification request that carries an APP ID, the first IP address, and a timestamp; and
  a newly defined verification request that carries an APP ID and the first IP address.

17. The computer-implemented system of claim 16, wherein when the verification request comprises the mobile phone identity verification request that carries the APP ID, the information about the first IP address, and the timestamp:
  before obtaining the information about the first IP address:
    receiving, by using an https link, a login verification request sent by the application client device;
    generating, as a generated symmetric key, a symmetric key after login verification succeeds; and
    sending the symmetric key to the application client device by using the https link.

18. The computer-implemented system of claim 17, wherein obtaining the information about the first IP address comprises:
  decrypting, by using the generated symmetric key and as a decrypted mobile phone identity verification request, the mobile phone identity verification request sent by the application client device.

19. The computer-implemented system of claim 18, obtaining the information about the first IP address, comprises
  obtaining the information about the first IP address from the decrypted mobile phone identity verification request.

20. The computer-implemented system of claim 17, wherein before obtaining the information about the first IP address, the one or more operations further comprise:
  receiving a login request from the application client device using a dedicated link; and
  performing login pre-authorization after receiving the login request.

* * * * *